United States Patent [19]

de l'Eprevier et al.

[11] Patent Number: 4,677,018

[45] Date of Patent: Jun. 30, 1987

[54] INSULATING PIECE IN DIFFERENT SHAPES, FORMED BY STACKED LAYERS OF FIBERS CAPABLE OF WITHSTANDING HIGH TEMPERATURES, AND MANUFACTURING PROCESS

[75] Inventors: Alain G. de l'Eprevier, Bourgoin Jallieu; Albert Garnier, Heyrieux, both of France

[73] Assignee: Produits Cellulosiques Isolants-Procelis, France

[21] Appl. No.: 788,716

[22] Filed: Oct. 17, 1985

[30] Foreign Application Priority Data

Oct. 25, 1984 [FR] France .................. 84 16517

[51] Int. Cl.$^4$ ............................................. B32B 7/02
[52] U.S. Cl. ................................ 428/218; 428/212; 428/284; 428/285; 428/920
[58] Field of Search ............... 428/212, 218, 284, 285, 428/920, 210

[56] References Cited

U.S. PATENT DOCUMENTS

| | | | |
|---|---|---|---|
| 3,053,715 | 9/1962 | Labmo | 428/218 |
| 3,911,188 | 10/1975 | Torti et al. | 428/218 |
| 4,131,664 | 12/1978 | Flowers et al. | 428/218 |
| 4,539,252 | 9/1985 | Franz | 428/920 |

FOREIGN PATENT DOCUMENTS

| | | |
|---|---|---|
| 964277 | 7/1964 | United Kingdom . |
| 1019208 | 2/1966 | United Kingdom . |
| 2025320 | 1/1980 | United Kingdom . |
| 2032845 | 5/1980 | United Kingdom . |

OTHER PUBLICATIONS

American Ceramic Sty Bulletin, vol. 60, No. 7, Jul. 1981, pp. 695–699, Columbus, Ohio, C. E. Chaille et al.

*Primary Examiner*—James J. Bell
*Attorney, Agent, or Firm*—Parkhurst & Oliff

[57] ABSTRACT

An insulating structure is provided which includes a succession of superposed layers of fibers capable of withstanding high temperatures. A hot face of the structure comprises fibers capable of withstanding temperatures higher than the fibers of the cold face. The layers have an apparent density which varies from the hot face to the cold face. The structure contains fibers which have temperature-resistant properties which progressively decrease from the hot face to the cold face. The structure according to this invention can advantageously be applied to line ovens.

3 Claims, 2 Drawing Figures

U.S. Patent  Jun. 30, 1987  4,677,018

INSULATING PIECE IN DIFFERENT SHAPES, FORMED BY STACKED LAYERS OF FIBERS CAPABLE OF WITHSTANDING HIGH TEMPERATURES, AND MANUFACTURING PROCESS

BACKGROUND OF THE INVENTION

The invention relates to a new type of insulating pieces for use in particular in electrical, heat and sound insulation, constituted by a stack of superposed layers of fibers capable of withstanding high temperatures. The invention also relates to a manufacturing process.

A number of processes for manufacturing insulating pieces in different shapes are known already.

French Patent FR-A-No. 1 213 048, describes such a process which consists in placing over a suitable form, a wet layer of cellulosic fibers, and in compressing said layer by means of a strip of elastic cloth, so as to exude the excess of water, and in finally drying the piece. This technique which is known to give excellent results in electrical applications, has nevertheless a number of drawbacks. Indeed, the pieces, being made with cellulosic fibers, cannot work at temperatures higher than 90°–100° C. Moreover, the form must allow for the shrinkage of the fibers. And finally, to produce a thick product, it is necessary to proceed in successive stages, with intermediate drying between each stage, which is lengthy and expensive and necessarily leads to a certain heterogeneity in the finished product.

Several other methods have already been proposed for producing pieces designed to work at high temperatures, namely temperatures above 800° C. For example, it has been proposed to use aqueous suspensions of refractory fibers, such as ceramic fibers, and to deposit said fibers by suction through a perforated form. This technique has undeniable advantages such as for example the homogeneity of the produced pieces, throughout their thickness. Also this technique is perfectly adapted to mass production of pieces of simple shapes, readily removable for the mold. But this technique is not economically advantageous for the production of unitary pieces. It even becomes quite unusable for producing complicated unmoldable shapes. And further, there is a practical limit to the thickness of the parts which can be produced, limit which is situated around 100 millimeters, whereas the normal thickness required to give an efficient heat insulation at temperatures above 1100° C., is often in excess of these limits.

According to an improved variant described in French Patent No. 1 602 362 (corresponding to British Pat. No. 1 296 681), it has been proposed to deposit over the porous form, successive layers of fibers arranged in regular order of heat resistance. As in the previous case, the water is removed from the different wet layers by suction through the form. Because precisely of that suction, as already indicated, the thickness of the finished product can hardly exceed 100 millimeters, which considerably restricts its practical aspect.

All of said processes cannot be used to obtain pieces of a density higher than 0.3, which are mechanically resistant. Yet, industries are demanding those mechanical characteristics more and more for high temperature-insulating pieces. Moreover, these processes only permit a small variation of the density and completely exclude the preparation of fluid-tight pieces. These drawbacks therefore limit considerably the scope of utilization of these pieces, particularly because of the lack of mechanical strength, of their excessive porosity and of the corrosion that may result therefrom, and of the limited thickness of the pieces.

SUMMARY OF THE INVENTION

It is an object of the present invention to overcome the above drawbacks by providing a dense piece (density greater than 0.3), mechanically resistant, for insulation purposes and in particular electric, heat and/or sound insulation, of different shape, able to work at temperatures exceeding 800° C., of any thickness, but in any case much thicker than 100 mm, and which is easy to produce in small numbers, while remaining economical.

Said dense and strong insulating piece of varied shape is constituted by a succession of superposed layers of fibers, capable of withstanding high temperatures, in which:

on the one hand, the layer which constitutes the hot face is composed, for the largest part, of fibers showing a high resistance to heat, on the other hand, the layer which constitutes the cold opposite face is composed, for the largest part, of fibers less resistant to heat than those used for the hot face, said piece being characterized:

in that the layers placed between these two external faces:
  on the one hand, have an apparent density which varies from the hot face to the cold face,
  on the other hand, contain fibers of which the properties of resistance to temperature, progressively decrease from the cold face to the hot face;

In other words, the invention consists in simultaneously varying the density of every layer from the hot face to the cold face, as well as the thermal resistance of the fibers constituting these layers. Thus, the heat conductivity of the finished piece is minimal for every isotherm.

According to a preferred embodiment of the invention, the hot face, also called "intrados", namely the face called on to work at the highest temperature, contains the fibers with the highest resistance to heat and has the highest density, hence the best mechanical and insulating properties. On the contrary, the cold face, also called "extrados", namely the face called on to work at the lowest temperature, has the lowest density. Since said cold face is constituted of fibers showing the least resistance to heat, this layer is the least expensive. This particular embodiment, in which the apparent density of the successive layers decreases progressively from the hot face to the cold face, is suitable for producing insulating pieces required to have excellent mechanical and thermal properties.

This is therefore quite different from the conventional teachings where the object was to find the lowest densities in order to obtain the best insulating properties. This apparent contradiction is due to the non-linear nature of the variation of the thermal conductivity as a function of temperature and density.

The "fibers withstanding high temperature", designate here fibers of varied length and nature, capable of withstanding without any noticeable damage, temperatures of at least 800° C. Mineral fibers, such as for example ceramic fibers or "wiskers" are advantageously used.

And advantageously, in practice:

the fibers are bound together with a binding composition;

the cold face is covered with a compact, cellulosic or metallic layer for extra rigidity and handling ease;

a gas-proof layer is interposed between two successive elementary layers; according to a first embodiment, said gas-proof layer is an aluminium foil which will be oxidized by subsequent treatment at high temperature; according to a second embodiment, said layer is formed by materials which are thermo-meltable, and which are melted subsequently.

The process for producing such an insulating piece in different shapes, is characterized in that it consists:

first in stacking a succession of wet elementary layers made of fibers able to withstand high temperatures, and impregnated with a binding composition, in which:

the layer meant to constitute the hot face contains the fibers with the highest resistance to heat, whereas the layer meant to constitute the cold face contains the fibers with the lowest resistance to heat, the apparent density varies from the hot face to the cold face;

then in known manner, in compressing the whole assembly in an elastic cloth, to allow exuding of the excess water and binder;

and finally, in drying the resulting piece.

Advantageously, in practice:

the assembly is subjected to a heat treatment in conditions such as to ceramize the binding composition;

the assembly is progressively heated to a temperature higher than the shrinkage temperature of the ceramic fibers, in order to cause a dimensional stabilization of said fibers;

at least one of the elementary layers can also contain a minor part of combustible fibers; and the assembly is heated to a temperature higher than the combustion temperature of said fibers, in order to create, by said heat treatment, pores and thus to reduce the apparent density of these layers;

between two successive elementary layers, is interposed a layer of a material capable, after a heat treatment, to create an impervious layer;

between two successive layers, a compression is operated in known manner, with an elastic cloth, in order to exude at least part of the excess binder.

Suitable as binding compositions, are any materials currently used for this type of application; for example mineral binders such as aluminium, magnesium, calcium or zirconium silicates, aluminium phosphates, or gel-forming solutions containing a large proportion of silica and alumina. Organic binders can also be used, their advantage being that they can be completely destroyed during the heat treatment.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein.

EXAMPLES AND DETAILED DESCRIPTION OF THE INVENTION

Example 1

Figure 1:
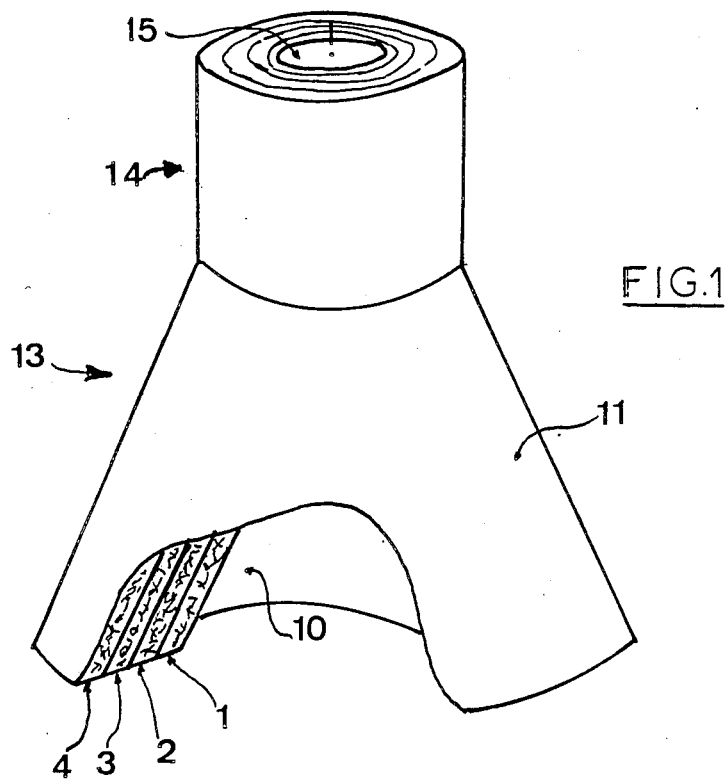
FIG. 1 shows an insulating piece of revolution produced according to the invention. The piece is formed by a truncated cone, joined by its top part to a cylinder, which is hollow in its center.
Figure 2:
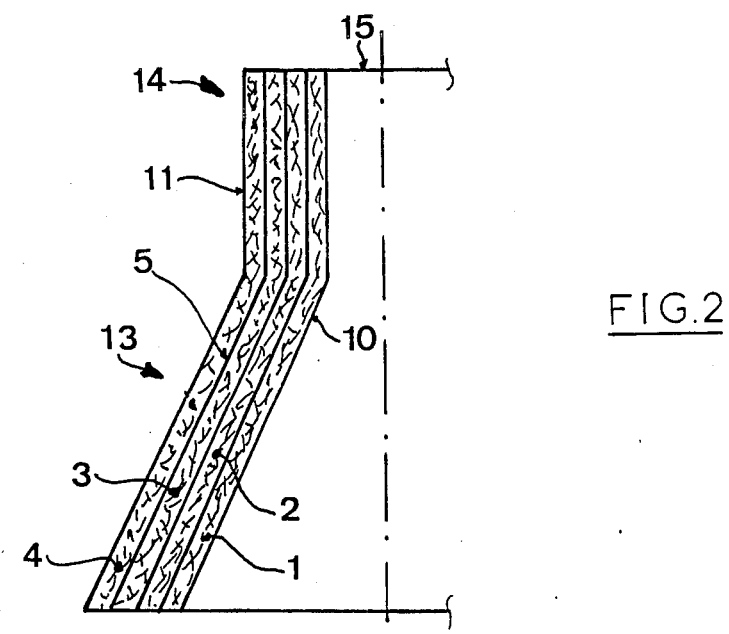
FIG. 2 is a cross-sectional view of the piece taken along a longitudinal plane.

On a truncated-cone shaped aluminium rigid form (13), joined by its top part to a cylinder (14), is deposited a first layer (1) of ceramic fibers of density 160 kg/m3 and 25 mm thickness, sold by "Lafarge Réfractaires" under the trademark "Kerlane K 60", impregnated by immersion in a bath of a refractory binder of aluminium silicate capable of standing a temperature of 1400° C.

In known manner, the binder is partly exuded by enclosing the layer in a strip of elastic cloth.

On said first exuded layer (1) which will form the hot face (10), is deposited a second likewise impregnated layer (2), having substantially the same characteristics and sold by "Lafarge" under the trade denomination "K60", but having, for a thickness of 19 mm, a density of 128 kg/m3.

A third wet layer (3) is deposited over said second layer (2) after partial exudation of the latter, said third layer being also composed of ceramic fibers sold by "Lafarge" under the trade denomination "K45", and having a density of 128 kg/m2 for a thickness of 12.7 mm. Said layer (3) is impregnated with a composition of aluminium silicate capable of withstanding temperatures of 1200° C.

Said layer (3) having been partly exuded as before, is covered with a last layer (4) of ceramic fibers sold by "Lafarge Réfractaires" under the trade denomination "K45" of 25 mm thickness, impregnated through with a binder based on silica and alumina, having a density of 96 kg/m3.

The outer face (11) which is meant to come into contact with the cold face, is enclosed in an elastic cloth, in such a way as to exude all excess binder. After five minutes of this exuding treatment, the cloth is removed, the whole piece is taken out of the form and placed in an oven at 150° C., to dry it.

Finally the binder is ceramized by thermal treatment for four hours at 1200° C.

The resulting insulating piece comprises:

a first internal layer (1) forming the hot face, with a density of about 0.35 and a thickness of 12 mm, capable of withstanding temperatures of around 1400° C.;

a second intermediate layer (2), less dense, (density around 0.25), of thickness 10 mm, and perfectly capable of withstanding temperatures of 1400° C.;

a third intermediate layer (3), still less dense than layer (2) for a thickness of 8 mm, and capable of withstanding temperatures of 1200° C.;

and finally, a fourth layer (4) forming the cold face, of which the external face (11) constitutes the cold side, which has a density of around 0.15 and a thickness of 20 mm, and which is perfectly capable of withstanding temperatures of 1150° C.

Example 2

The procedure is the same as in Example 1, except that an aluminium foil (5) is inserted between intermediate layers (3) and (4), said foil being about 20 microns thick and coated with the binder.

After drying the assembly is treated at temperatures of about 1150° C. The aluminium foil becomes oxidized, without tearing, into a continuous film of alumina, this rendering the piece impervious

Example 3

The procedure is the same as in Example 1. After drying at 150° C., the piece is heated for several hours at 1350° C. on the hot face but with a progression of the temperature.

This causes the initial shrinkage of the ceramic fibers, which subsequently results in an excellent dimensional stability of the piece. This variant becomes useful when the required shrinkage is substantially nil.

Example 4

The procedure is the same as in Example 1, except that on the external layer (4) is added an extra layer of cellulosic fibers, and that the baking and stabilization treatment is eliminated. After drying at 110° C. instead of 150° C., said extra layer behaves like cardboard thus giving the assembly great rigidity and making handling easier.

Example 5

The procedure is the same as in Example 1, except that the external layer (4) is replaced by a mixture of cellulosic fibers and ceramic fibers capable of withstanding temperatures of 1200° C., the proportion of cellulosic fibers being 10% by weight.

The result after drying and baking at 1350° C., is, not only an excellent dimensional stability, but also an elimination of the cellulosic fibers which are burnt. In burning, said fibers cause the appearance of pores, which reduce the density of the layer (4) and permits its adaptation to its function, if this proves necessary.

The technique according to the invention presents many advantages over the techniques known heretofore. For example:

possibility of producing insulating pieces of great thickness, namely thicknesses greater than 100 mm, which is the maximum currently obtained with the technique of the suction on a perforated form, even with the teachings of French Pat. No. 1 602 362 cited hereinabove in the preamble;

possibility to readily produce substantially homogeneous pieces, each layer adhering firmly to the next over its entire surface;

dimensional stability of the produced insulating pieces, hence accurate observation of set dimensions:

possibility to produce impervious pieces;

possibility to optimize the apparent density of every part of the piece for a better adaptation to requirements.

possibility to apply a surface treatment, for example to limit or eliminate erosion in the case of high wind speeds, to reduce the effect of mechanical shocks and in general every case wherein a special surface condition is advantageous;

possibility to economically produce insulating pieces of which the density can reach 0.7 and even 0.9 (against 0.3 in the prior art), such high densities being required for example in the aluminium and non-ferrous metals industries;

possibility to produce pieces combining of high density with great mechanical strength, which up to now had been impossible.

Thus, said pieces can be used successfully in all applications where the aim is not only to find an excellent heat insulation at high temperatures, but also to find physical and/or chemical properties which, heretofore, had been a technically unsolvable problem. The pieces find an application in every field where temperatures higher than 800° C. have to be used. By way of example, they can be used in petrochemistry, in the nuclear industry, in the aeronautical and aerospace industry, in heat engineering, and in the construction of furnaces used in metallurgy.

While the present invention has been described in its preferred embodiments, it is to be understood that the invention is not limited thereto, and may be otherwise embodied within the scope of the following claims.

What is claimed is:

1. A high temperature insulating structure comprising a plurality of superposed layers of fibers, capable of withstanding temperatures of at least 800° C., said plurality of layers including an external hot face layer, an opposite external cold face layer and at least one intermediate layer sandwiched between said external hot face layer and said external cold face layer, wherein:

said external hot face layer comprises fibers having a high resistance to heat;

said external cold face layer comprises fibers less resistant to heat than said fibers comprising said external hot face layer;

said at least one intermediate layer having a resistance to heat which is intermediate between said external hot face layer and said external cold face layer; and said external hot face layer having a highest apparent density of said plurality of superposed layers of fibers and said external cold face layer having a lowest apparent density of said plurality of superposed layers, and said at least one intermediate layer having an apparent density which is intermediate between the apparent densities of the external hot face layer and the external cold face layer.

2. The insulating structure of claim 1, wherein the fibers having a high resistance to heat comprise ceramic fibers.

3. The insulating structure of claim 1, wherein said at least one intermediate layer comprises a layer which is impervious to fluid flow at high temperature.

* * * * *